(12) United States Patent
Bartos et al.

(10) Patent No.: US 10,187,412 B2
(45) Date of Patent: Jan. 22, 2019

(54) ROBUST REPRESENTATION OF NETWORK TRAFFIC FOR DETECTING MALWARE VARIATIONS

(71) Applicant: Cisco Technology, Inc., San Jose, CA (US)

(72) Inventors: Karel Bartos, Prague (CZ); Michal Sofka, Pragues (CZ)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 14/946,156

(22) Filed: Nov. 19, 2015

(65) Prior Publication Data
US 2017/0063892 A1 Mar. 2, 2017

Related U.S. Application Data

(60) Provisional application No. 62/211,363, filed on Aug. 28, 2015.

(51) Int. Cl.
*H04L 29/06* (2006.01)
(52) U.S. Cl.
CPC ............... *H04L 63/1425* (2013.01)
(58) Field of Classification Search
CPC .................................. H04L 63/1425
USPC ........................................... 726/23
See application file for complete search history.

(56) References Cited

U.S. PATENT DOCUMENTS

| | | | |
|---|---|---|---|
| 7,047,423 B1 * | 5/2006 | Maloney | H04L 63/1408 345/473 |
| 7,809,670 B2 | 10/2010 | Lee et al. | |
| 8,418,249 B1 * | 4/2013 | Nucci | G06F 21/552 706/20 |

(Continued)

FOREIGN PATENT DOCUMENTS

WO 2014/149080 A1 9/2014

OTHER PUBLICATIONS

Lin et al., "Splog Detection Using Self-similarity Analysis on Blog Temporal Dynamics", AIRWeb 2007, May 8, 2007, Banff, Alberta, Canada, 8 pages.

(Continued)

*Primary Examiner* — Khalil Naghdali
(74) *Attorney, Agent, or Firm* — Edell, Shapiro & Finnan, LLC

(57) ABSTRACT

Techniques are presented that identify malware network communications between a computing device and a server based on a cumulative feature vector generated from a group of network traffic records associated with communications between computing devices and servers. Feature vectors are generated, each vector including features extracted from the network traffic records in the group. A self-similarity matrix is computed for each feature which is a representation of the feature that is invariant to an increase or a decrease of feature values across all feature vectors in the group. Each self-similarity matrix is transformed into corresponding histograms to be invariant to a number of network traffic records in the group. The cumulative feature vector is a cumulative representation of the predefined set of features of all network traffic records included in the at least one group of network traffic records and is generated based on the corresponding histograms.

20 Claims, 9 Drawing Sheets

(56) References Cited

U.S. PATENT DOCUMENTS

| | | | | |
|---|---|---|---|---|
| 9,843,596 | B1* | 12/2017 | Averbuch | H04L 63/1416 |
| 2008/0184371 | A1* | 7/2008 | Moskovitch | G06F 21/566 |
| | | | | 726/24 |
| 2009/0174551 | A1* | 7/2009 | Quinn | G06F 21/552 |
| | | | | 340/540 |
| 2009/0313700 | A1 | 12/2009 | Home | |
| 2014/0165207 | A1* | 6/2014 | Engel | H04L 63/1425 |
| | | | | 726/25 |
| 2015/0128263 | A1* | 5/2015 | Raugas | H04L 63/1408 |
| | | | | 726/23 |

OTHER PUBLICATIONS

Alexander V. Barsamian, "Network Characterization for Botnet Detection Using Statistical-Behavioral Methods", A Thesis Submitted to the Faculty in partial fulfillment of the requirements for the degree of Master of Science, Thayer School of Engineering, Dartmouth College, Hanover, New Hampshire, Jun. 2009, 72 pages.

Delio Brignoli, "DDOS Detection Based on Traffic Self-Similarity", A thesis submitted in partial fulfillment of the requirements for the Degree of Master of Science in Computer Science in the University of Canterbury, University of Canterbury, 2008, 116 pages.

Kang et al., "Accurate Detection of Peer-to-Peer Botnet using Multi-Stream Fused Scheme", Journal of Networks, vol. 6, No. 5, May 2011, 8 pages.

Deselaers et al., "Global and Efficient Self-Similarity for Object Classification and Detection", 2010 IEEE Conference on Computer Vision and Pattern Recognition (CVPR), Jun. 13-18, 2010, San Francisco, CA, 8 pages.

Chen et al., "Exploring Self-Similarities of Bag-of-Features for Image Classification", MM'11, Nov. 28-Dec. 1, 2011, Scottsdale, Arizona, USA, ACM 978-1-4503-0616-4/11/11, 4 pages.

Kong et al., "Discriminant Malware Distance Learning on Structural Information for Automated Malware Classification", KDD'13, Aug. 11-14, 2013, Chicago, Illinois, USA, Los Alamos National Laboratory Publication No. LA-UR 12-26699, 9 pages.

Shechtman et al., "Matching Local Self-Similarities across Images and Videos", Dept. of Computer Science and Applied Math, The Weizmann Institute of Science, IEEE Conference on Computer Vision and Pattern Recognition, Jun. 17-22, 2007, Minneapolis, MN, 8 pages.

Gandotra et al., "Malware Analysis and Classification: A Survey", Scientific Research, Journal of Information Security, 2014, 5, 56-64, Published Online Apr. 2014 in SciRes, http://www.scirp.org/journal/jis, http://dx.doi.org/10.4236/jis.2014.52006, 9 pages.

Gretton et al., "Covariate Shift by Kernel Mean Matching", Dataset shift in machine learning 3.4 (2009): 5, 38 pages.

Duan et al., "Domain Transfer Multiple Kernel Learning", IEEE Transactions on Pattern Analysis and Machine Intelligence, Mar. 2012, 16 pages.

Iyer et al., "Maximum Mean Discrepancy for Class Ratio Estimation: Convergence Bounds and Kernel Selection", Proceedings of the 31st International Conference on Machine Learning (ICML-14), Beijing, China, 2014, 9 pages.

Dai et al., "Boosting for Transfer Learning", Proceedings of the 24th International Conference on Machine Learning (ICML '07), Corvallis, OR, 2007, 8 pages.

* cited by examiner

500

| 505 | DIVIDING NETWORK TRAFFIC RECORDS SO AS TO CREATE AT LEAST ONE GROUP OF NETWORK TRAFFIC RECORDS, THE AT LEAST ONE GROUP INCLUDING RECORDS OF NETWORK COMMUNICATIONS BETWEEN A COMPUTING DEVICE AND A SERVER FOR A PREDETERMINED PERIOD OF TIME |

↓

| 510 | GENERATING A SET OF FEATURE VECTORS, EACH FEATURE VECTOR REPRESENTING ONE OF THE RECORDS OF THE NETWORK COMMUNICATIONS INCLUDED IN THE AT LEAST ONE GROUP OF NETWORK TRAFFIC RECORDS, WHEREIN EACH FEATURE VECTOR COMPRISES A PREDEFINED SET OF FEATURES EXTRACTED FROM ONE OF THE NETWORK TRAFFIC RECORDS |

↓

| 515 | COMPUTING A SELF-SIMILARITY MATRIX FOR EACH FEATURE OF THE PREDEFINED SET OF FEATURES USING ALL FEATURE VECTORS GENERATED FOR THE AT LEAST ONE GROUP, EACH SELF-SIMILARITY MATRIX BEING A REPRESENTATION OF ONE FEATURE OF THE PREDEFINED SET OF FEATURES THAT IS INVARIANT TO AN INCREASE OR A DECREASE OF VALUES OF THE ONE FEATURE ACROSS ALL OF THE FEATURE VECTORS GENERATED FOR THE AT LEAST ONE GROUP OF NETWORK TRAFFIC RECORDS |

↓

| 520 | TRANSFORMING EACH SELF-SIMILARITY MATRIX INTO A SET OF CORRESPONDING HISTOGRAMS, EACH HISTOGRAM BEING A REPRESENTATION OF THE ONE FEATURE THAT IS INVARIANT TO A NUMBER OF NETWORK TRAFFIC RECORDS IN THE AT LEAST ONE GROUP OF NETWORK TRAFFIC RECORDS |

↓

| 525 | GENERATING A CUMULATIVE FEATURE VECTOR BASED ON THE SET OF CORRESPONDING HISTOGRAMS, THE CUMULATIVE FEATURE VECTOR BEING A CUMULATIVE REPRESENTATION OF THE PREDEFINED SET OF FEATURES OF ALL NETWORK TRAFFIC RECORDS INCLUDED IN THE AT LEAST ONE GROUP OF NETWORK TRAFFIC RECORDS |

↓

| 530 | IDENTIFYING A MALWARE NETWORK COMMUNICATION BETWEEN THE COMPUTING DEVICE AND THE SERVER BASED ON THE CUMULATIVE FEATURE VECTOR |

FIG.5

ROBUST REPRESENTATION OF NETWORK TRAFFIC FOR DETECTING MALWARE VARIATIONS

CROSS REFERENCE TO RELATED APPLICATION

This application claims priority to U.S. Provisional Patent Application No. 62/211,363, filed Aug. 28, 2015, the entirety of which is incorporated herein by reference.

TECHNICAL FIELD

The present disclosure relates to malware detection.

BACKGROUND

All corporate networks are infected by malware. As the variability of malware samples has been rapidly increasing over the last years, existing signature-based security devices, firewalls, or anti-virus solutions provide only partial protection against these threats.

The ability to detect new variants and modifications of existing malware is becoming very important. Machine learning is beginning to be successfully applied to complement signature-based devices. However, machine learning methods require a large amount of labeled data for training, which limits their applicability due to high costs associated with labeling. Moreover, a malware detector is trained at a certain point in time, but malware evolves over time to evade detection.

BRIEF DESCRIPTION OF THE DRAWINGS

FIG. 5 is a flow chart depicting operations performed by a networking device according to an example embodiment.

DESCRIPTION OF EXAMPLE EMBODIMENTS

Overview

Figure 1:
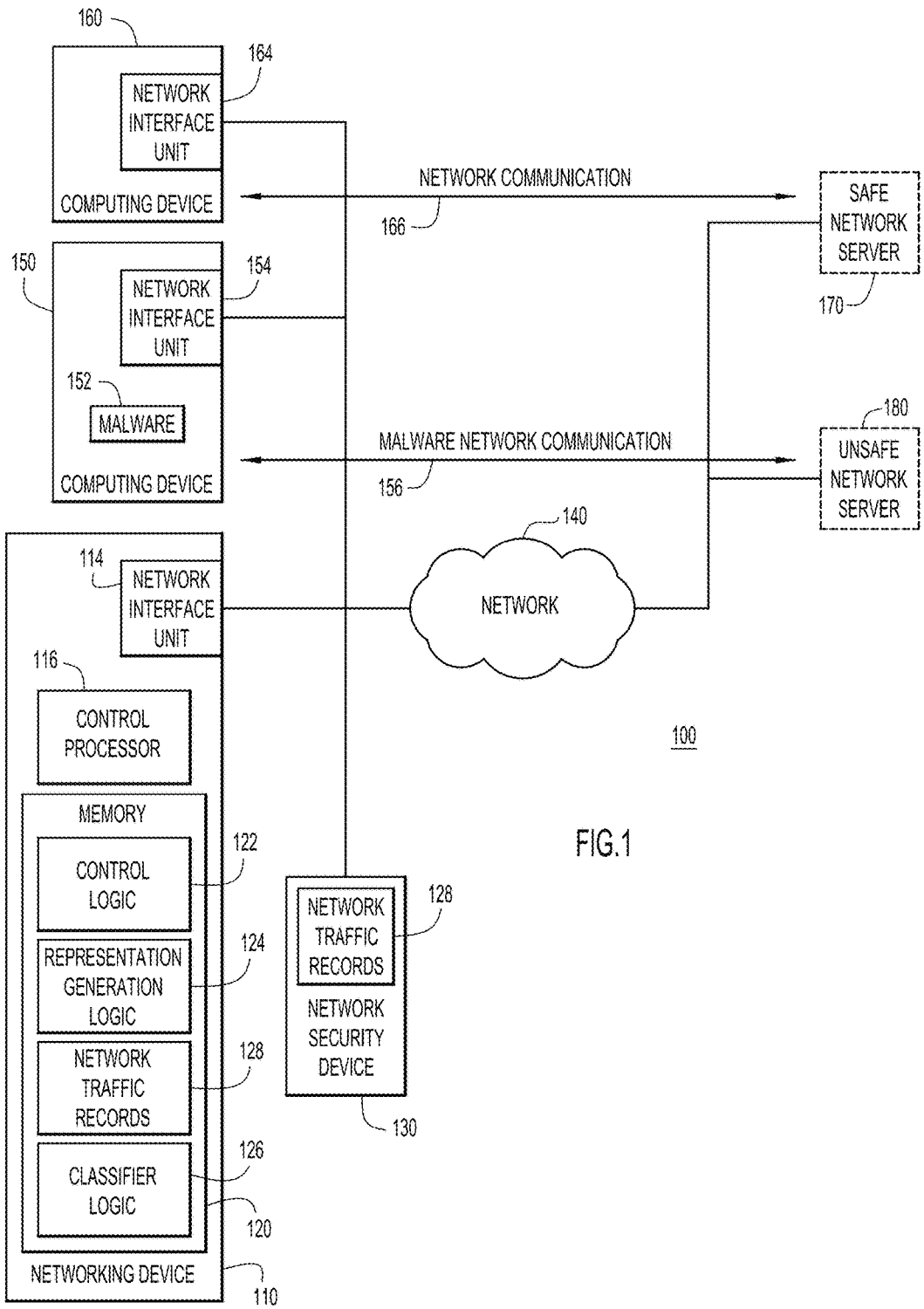
FIG. 1 is a diagram of a network environment in which the malware detection techniques presented herein may be used, according to an example embodiment.

Techniques are presented herein to generate a robust representation of network traffic that is invariant against changes of malware behavior over time and that can be utilized to identify malware network communications between a computing device and a server. The techniques are used to generate a cumulative feature vector. The cumulative feature vector is invariant under shifting and scaling of feature values extracted from the network traffic records and under permutation and size changes of groups of network traffic records.

Network traffic records are divided to create at least one group of network traffic records, the at least one group including network traffic records associated with network communications between the computing device and the server for a predetermined period of time. A set of feature vectors is generated, each feature vector of the set of feature vectors representing one of the network traffic records of the network communications included in the at least one group of network traffic records. Each feature vector includes a predefined set of features extracted from one of the network traffic records. A self-similarity matrix is computed for each feature of the predefined set of features using all feature vectors generated for the at least one group. Each self-similarity matrix is a representation of one feature of the predefined set of features that is invariant to an increase or a decrease of values of the one feature across all of the feature vectors generated for the at least one group of network traffic records. Each self-similarity matrix is transformed into a corresponding histogram to form a set of histograms, each histogram being a representation of the one feature that is invariant to a number of network traffic records in the at least one group of network traffic records. The cumulative feature vector is a cumulative representation of the predefined set of features of all network traffic records included in the at least one group of network traffic records and is generated based on the set of histograms.

Example Embodiments

Presented herein are techniques to solve the problem of detecting variants of malicious behavior from network traffic records (e.g. proxy logs or NetFlow records) associated with network communications between any given computing device in a network to be protected and a device (e.g., a server) outside the network that is to be protected. A representation of malware samples is provided that is invariant against variations and temporal changes. This means that new and unseen malware variants are represented with similar feature vectors as existing known malware, which greatly facilitates detecting new or modified malicious behaviors. Representing network traffic according to these techniques leads to significantly improved efficacy results, as described below.

In the context of malware, a representation that is invariant against shifting, scaling, permutation, and size means that any change in the number of flows of an attack (size invariance) or in the ordering of flows (permutation invariance) will not avoid detection. Shift and scale invariance ensures that any internal variations of malware behavior described by a predefined set of features will not change the representation as well.

FIG. 1 is a block diagram of a network environment 100 in which the malware detection techniques presented herein may be employed. Network environment 100, includes networking device 110 which may be a server computer, firewall, network intrusion device, etc. Networking device 110 includes network interface unit 114 (e.g., a network port of a network interface card) which connects networking device 110 with network 140 (e.g., the Internet), a control processor 116 (or multiple processors) and a memory 120. Memory 120 stores instructions for, among other functions, control logic 122, representation generation logic 124 and classifier logic 126. Network security device 130 (e.g., a firewall) or any other network device connected to network 140 may generate network traffic records 128 (e.g. proxy logs or NetFlow records) that are sent to networking device 110 and stored in memory 120.

The memory 120 may be read only memory (ROM), random access memory (RAM), magnetic disk storage media devices, optical storage media devices, flash memory devices, electrical, optical, or other physical/tangible memory storage devices. Thus, in general, the memory 120 may comprise one or more tangible (non-transitory) computer readable storage media (e.g., a memory device) encoded with software comprising computer executable instructions and when the software is executed (by the processor 116) it is operable to perform the operations described herein. The networking device 110 performs the operations described below in connection with FIGS. 2-4 when executing the software stored in memory 120.

FIG. 1 shows computing device 150 on which malware 152 resides and is executed, and which is connected to network 140 via network interface unit 154. FIG. 1 also shows computing device 160 which is connected to network 140 via network interface unit 164 and which is not infected by malware. Computing devices 150 and 160 may be, for example, part of an enterprise network (not shown), and the enterprise network may include, but is not limited to, a plurality of computing devices, servers and other networking devices that may be infected by malware. This malware may change its behavior over time resulting in varying network traffic records produced by the malware.

In addition, several other network elements may be connected to network 140, such as for example, safe network server 170 and unsafe network server 180. FIG. 1 further shows malware network communication 156 between infected computing device 150 and unsafe network server 180 and network communication 166 between computing device 160 and safe network server 170.

Figure 2:
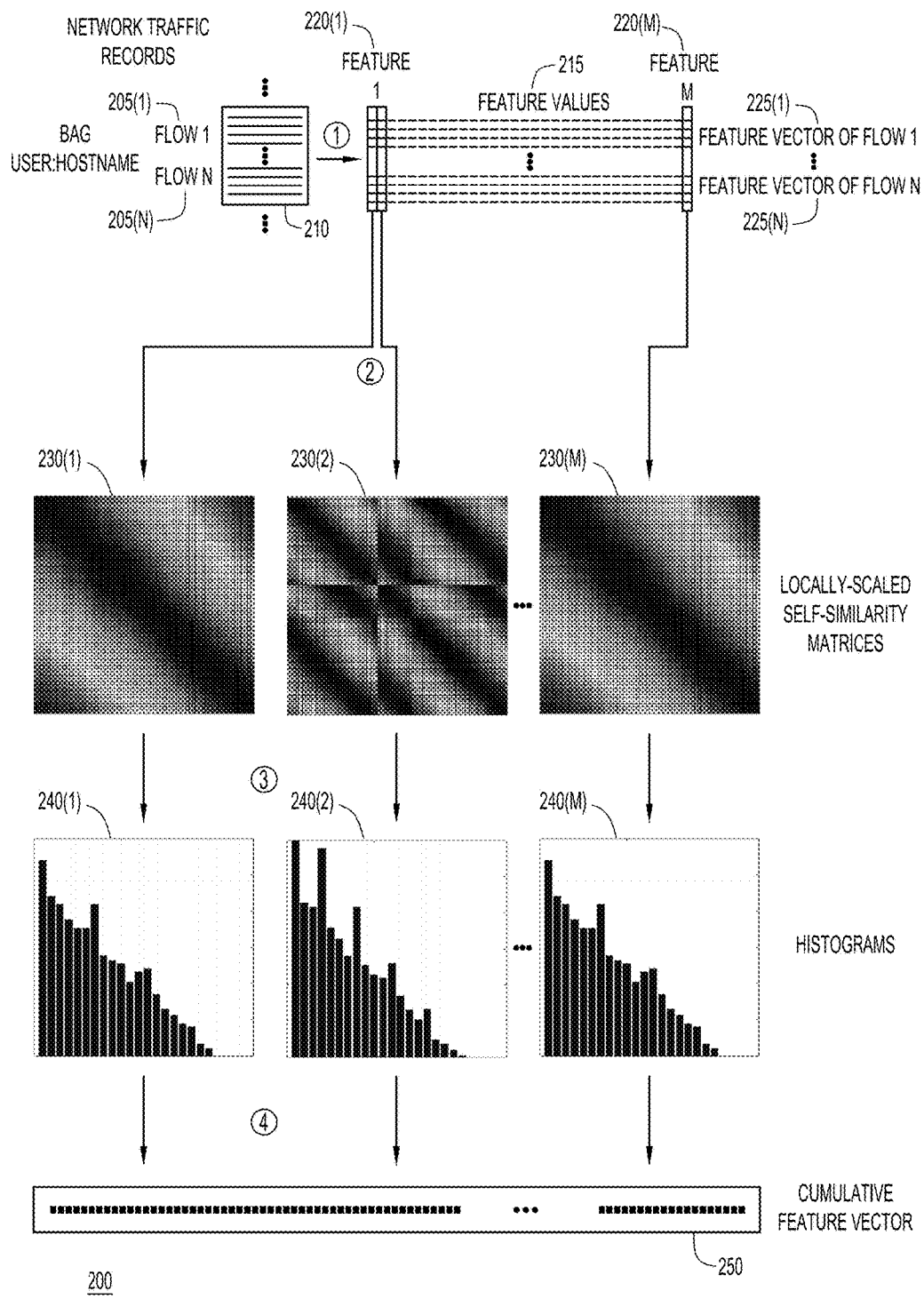
FIG. 2 is a diagram depicting a process for generating a representation of network traffic for detecting malware variations, according to an example embodiment.
Figure 3:
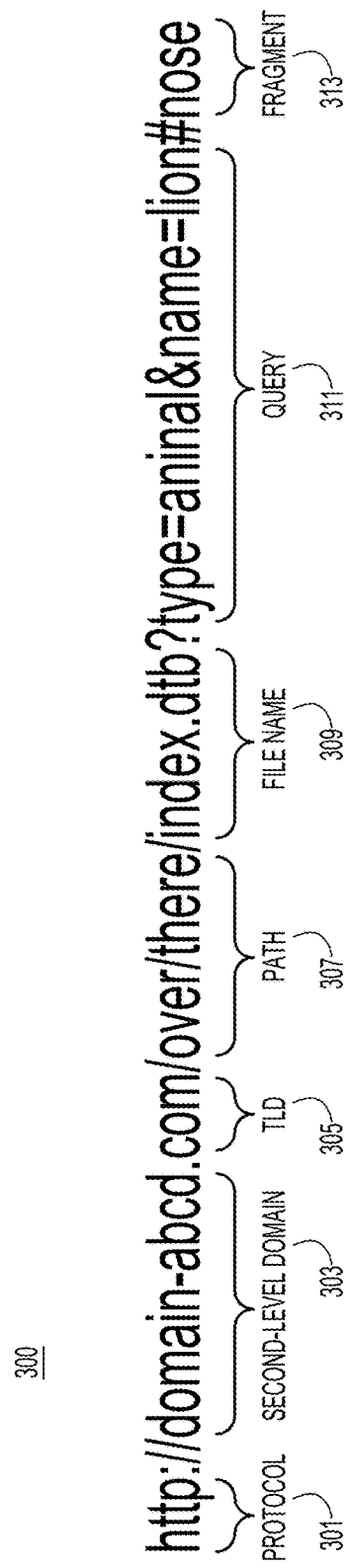
FIG. 3 is a diagram illustrating decomposition of a Uniform Resource Locator (URL) into logical parts according to an example embodiment.

Reference is now made to FIGS. 2 and 3 (with continued reference to FIG. 1). FIG. 2 is a diagram depicting a process performed by networking device 110 for generating a representation of network traffic for detecting malware variations through execution of representation generation logic 124. FIG. 2 shows network traffic records stored in memory 120 of networking device 110. As discussed above, network traffic records may be generated by network security device 130 or by any other networking device. Network traffic records are associated with flows 205(1) to 205(N). Each flow represents one communication between a computing device and a server. A flow is a group of packets which have the same source and destination address, the same source and destination port, and which use the same protocol. For example, a group of packets exchanged between computing device 150 and unsafe network server 180 representing malware network communication 156 may constitute flows 205(1)-205(N). Port numbers may be changed during the communication which results in more flows. Network traffic is bidirectional. Thus, network traffic records such as proxy logs contain data for both directions of a communication of a given flow.

A flow may consist of the following flow fields: user name, source address (e.g., a source Internet protocol (IP) address), source port, destination port, protocol, number of bytes transferred from a client device (e.g., computing devices 150 and 160) to a server (e.g., safe network server 170 and unsafe network server 180) and from the server to the client device, flow duration, timestamp, user agent, URL, referrer, Multipurpose Internet Mail Extensions (MIME) type, and Hypertext Transfer Protocol (HTTP) status. The most informative flow field is the URL field 300 shown in FIG. 3. As shown in FIG. 3, URL field 300 includes seven logical parts, namely protocol 301, second-level domain 303, top-level domain 305, path 307, file name 309, query 311, and fragment 313.

Returning back to FIG. 2, network traffic records are grouped or divided into "bags" or buckets. Each "bag" contains network traffic records with the same user name (or with the same source address) and with the same hostname of the server (second-level domain in the URL field of the flow fields) for a given period of time. Thus, each bag represents communication of a user with a particular domain. There is no limit on the size of each bag, i.e., the number of network traffic records in each bag. However, to compute a meaningful histogram as discussed below, at least 5 network traffic records are included in the bag.

In the example shown in FIG. 2, a plurality of network traffic records belonging to flows 205(1) to 205(N) is grouped together to form bag 210. At processing stage 1 shown in FIG. 2, from the flow fields of flows 205(1) to 205(N), feature values 215 for a predefined set of flow-based features 220(1)-220(M) are extracted for each network traffic record in bag 210. The predefined set of flow-based features 220(1) to 220(M) includes features describing URL structures (such as URL length, decomposition, or character distribution), the number of bytes transferred from the server to the client device and vice versa, the user agent, the HTTP status, the MIME type, and the port, etc. An example list of extracted features is shown in Table 1. Features from the right column of Table 1 are applied on all URL parts.

TABLE 1

List of features extracted from proxy logs (flows)

| Features | Features applied on all URL parts + referrer |
|---|---|
| Duration | length |
| HTTP status | digit ratio |
| is URL encrypted | lower case ratio |
| is protocol HTTPS | upper case ratio |
| number of bytes up | vowel changes ratio |
| number of bytes down | has repetition of '&' and '=' |
| is URL in ASCII | starts with number |
| client port number | number of non-base64 characters |
| server port number | has a special character |
| user agent length | max length of consonant stream |
| MIME-Type length | max length of vowel stream |
| number of '/' in path | max length of lower case stream |
| number of '/' in query | max length of upper case stream |
| number of '/' in referer | max length of digit stream |
| is second-level domain rawIP | ratio of a character with max occurrence |

At the end of processing stage 1, bag 210 is represented as a set of feature vectors 225(1) to 225(N), where there is one vector for each flow.

At processing stages 2-4, the representation of bag 210 is transformed into a cumulative feature vector 250, wherein such a representation of bag 210 is invariant against several malware variations, including: shift, scale, permutation, and size of the bags. The transformation process begins at processing stage 2, in which locally-scaled self-similarity matrices 230(1) to 230(M) are calculated.

Cumulative feature vectors are calculated for both bags representing training data to train classifier logic 126 and bags to be classified by classifier logic 126. The probability distribution of a bag representing training data may be different from the probability distribution of the bag to be classified. Therefore, the representation of the bags in the form of feature vectors needs to be transformed to be invariant to this shift. The shift is typically caused by the dynamics of the domain or environment. A shift means that some original feature values of all network traffic records in the bag are increased or decreased by a given amount. Thus, transforming the representation of a bag to be invariant against shifts ensures that even if some original feature values of all network traffic records in a bag are increased or decreased by a given amount, the values in the new representation remain unchanged.

Scale variance is caused by some original feature values of all network traffic records in the bag being multiplied by a common factor. Scale invariance guarantees that even if some original feature values of all network traffic records in a bag are multiplied by a common factor, the values in the new representation remain unchanged.

Shift invariance is ensured by computing a self-similarity matrix for each feature using all network traffic records in a bag. The traditional representation of an i-th bag $X_i$ that consists of a set of m network traffic records $\{x_1, \ldots, x_m\}$ is in the form of a matrix:

$$X_i = \begin{pmatrix} x_1 \\ \vdots \\ x_m \end{pmatrix} = \begin{pmatrix} x_1^1 & x_1^2 & \ldots & x_1^n \\ & & \vdots & \\ x_m^1 & x_m^2 & \vdots & x_m^n \end{pmatrix},$$

where $x_l^k$ denotes the k-th feature value of the l-th network traffic record from bag $X_i$. In order to generate a representation of the i-th bag that guarantees shift invariance, a translation invariant distance function is provided that holds:

$$d(x_1, x_2) = d(x_1 + a, x_2 + a).$$

This translation invariant distance function can also be expressed as follows:

$$I_p^k = I_q^k - s_{pq}^k$$

where $I_p^k$, $I_q^k$ denote the k-th feature value of the p-th and q-th network traffic record from bag $X_i$, and $s_{pq}^k$ defines the difference between values $x_p^k$, $x_q^k$. Then it holds for each translation invariant distance function d:

$$d(x_p^k, x_q^k) = d(x_p^k, I_p^k + s_{pq}^k) = d(0, s_{pq}^k) = s_{pq}^k.$$

The feature value $d(x_p^k, x_q^k)$ expresses the distance between the two values of k-th feature regardless of their absolute values. This value is more robust, however it could be less informative, as the information about the absolute values was removed. To compensate the possible information loss, the bags are represented with a matrix of these distances $d(I_p^k, x_q^k)$, which is called a self-similarity matrix $S^k$. The self-similarity matrix is a symmetric positive semi-definite matrix, where rows and columns represent individual flows, and an (i,j)-th element corresponds to the distance between the feature value of an i-th network traffic record and a j-th network traffic record.

Each bag is transformed into a set of self-similarity matrices. In other words, for the i-th bag $X_i$ a per-feature self-similarity set of matrices $S_i = \{S_i^1, S_i^2, \ldots, S_i^n\}$ is computed, where $$S_i^k = \begin{pmatrix} s_{11}^k & s_{12}^k & \ldots & s_{1m}^k \\ s_{21}^k & s_{22}^k & \ldots & s_{2m}^k \\ & & \vdots & \\ s_{m1}^k & s_{m2}^k & \ldots & s_{mn}^k \end{pmatrix} = \begin{pmatrix} d(x_1^k, x_1^k) & d(x_1^k, x_2^k) & \ldots & d(x_1^k, x_m^k) \\ d(x_2^k, x_1^k) & d(x_2^k, x_2^k) & \ldots & d(x_2^k, x_m^k) \\ & & \vdots & \\ d(x_m^k, x_1^k) & d(x_m^k, x_2^k) & \ldots & d(x_m^k, x_m^k) \end{pmatrix},$$

and $S_{pq}^k = d(x_p^k, x_q^k)$ is a distance between feature values and $I_p^k$ and $x_q^k$ of the k-th feature.

Scale invariance is introduced by local feature scaling, where all values in each self-similarity matrix are scaled into interval [0,1]. Scaling as called "local" because maximum and minimum values used for scaling are computed only for network traffic records within a bag. Thus, to guarantee the scale invariance, the matrix $S_i^k$ is locally-scaled into the interval [0,1] as follows:

$$\tilde{S}_i^k = \begin{pmatrix} \tilde{s}_{11}^k & \tilde{s}_{12}^k & \ldots & \tilde{s}_{1m}^k \\ \tilde{s}_{12}^k & \tilde{s}_{22}^k & \ldots & \tilde{s}_{2m}^k \\ & & \vdots & \\ \tilde{s}_{m1}^k & \tilde{s}_{m2}^k & \ldots & \tilde{s}_{mn}^k \end{pmatrix}, \tilde{s}_{pq}^k = \frac{s_{pq}^k - \min_{i,j}(s_{ij}^k)}{\max_{i,j}(s_{ij}^k) - \min_{i,j}(s_{ij}^k)}.$$

Returning now to FIG. 2 (with continued reference to FIG. 1), at processing stage 2, for each feature 220(1) to 220(M), corresponding locally-scaled self-similarity matrices 230(1) to 230(M) are calculated by representation generation logic 124 of networking device 110.

Generally, since there is no restriction on the size of bag 210 (i.e., the number of network traffic records included in the bag) the corresponding locally-scaled self-similarity matrices 230(1) to 230(M) can be of various sizes. Comparing such matrices of various sizes may be quite burdensome and, therefore, the representation of bag 210 needs to be invariant against the size of bag 210, i.e., it needs to be size invariant. Moreover, in highly dynamic environments, the network traffic records may occur in a variable ordering. Therefore, the representation of bag 210 needs also be invariant against any reordering of rows and columns, i.e., it needs to be permutation invariant.

At processing stage 3 in FIG. 2, representation generation logic 124 creates histograms 240(1) to 240(M) from all values of each locally-scaled self-similarity matrix 230(1) to 230(M). More specifically, to ensure permutation and size invariance, every locally-scaled self-similarity matrix 230(1) to 230(M) is transformed into a single histogram 240(1) to 240(M). Calculating histograms 240(1) to 240(M) ensures the same results for any reordering of network traffic records or the number of network traffic records in bag 210, respectively.

Each histogram 240(1) to 240(M) is associated with one of the features 220(1) to 220(M). At processing stage 4 in FIG. 2, all histograms 240(1) to 240(M) that belong to bag 210 are concatenated to generate a cumulative feature vector 250 which is the final representation of bag 210. Cumulative feature vector 250 is invariant against shift, scale, permutation and size of bag 210.

Figure 4:
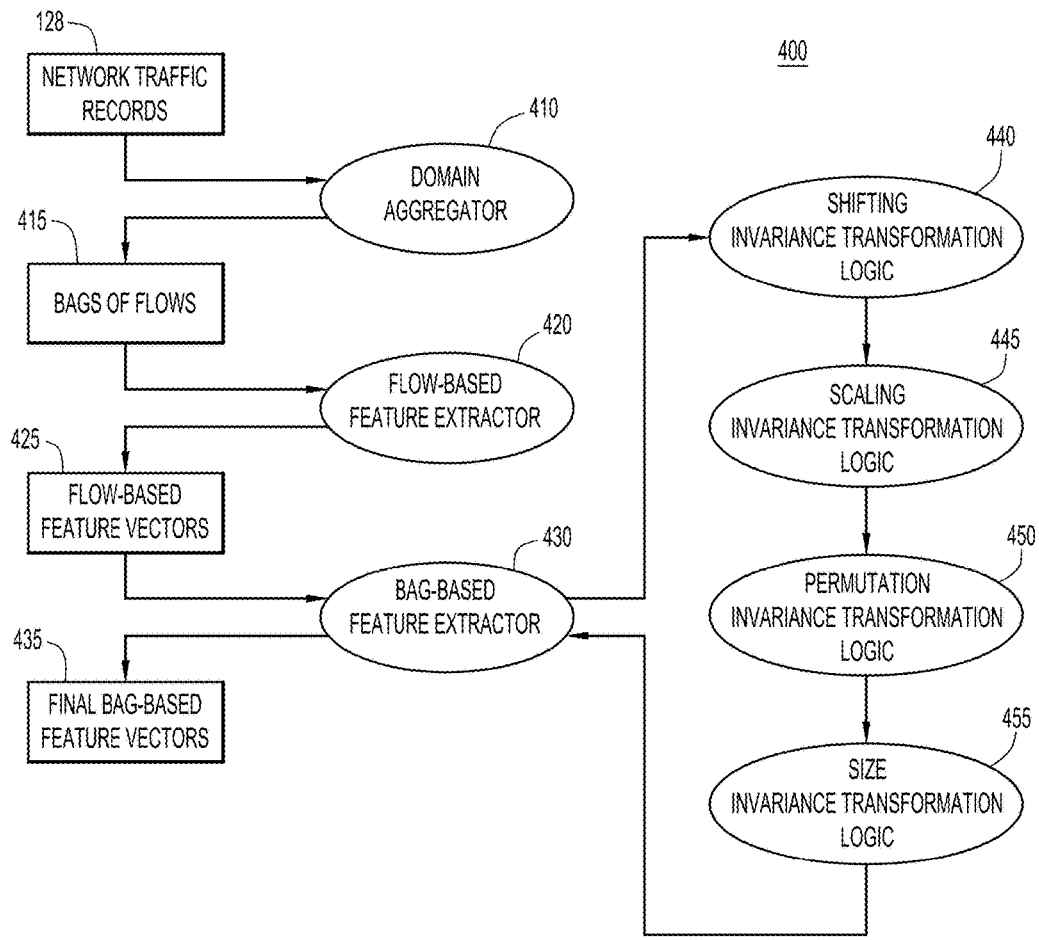
FIG. 4 is a diagram depicting elements of a representation generator and operations performed by these elements according to an example embodiment.

Referring now to FIG. 4 (with continued reference to FIGS. 1 and 2). FIG. 4 is a diagram depicting a representation generator 400 for generating final or cumulative bag-based feature vectors that correspond to feature vector 250 in FIG. 2. Representation generator 400 includes a domain aggregator 410, a flow-based feature extractor 420 and a bag-based feature extractor 430. Domain aggregator 410, flow-based feature extractor 420 and bag-based feature extractor 430 may be implemented as elements of representation generation logic 124 shown in FIG. 1.

As shown in FIG. 4, domain aggregator 410 obtains network traffic records 128 and divides them into bags of flows 415 (which correspond to bag 210 in FIG. 2). From the bags of flows 415, flow-based feature extractor 420 generates flow-based feature vectors 425. Bag-based feature extractor logic 430 transforms the flow-based feature vectors 425 into final bag-based feature vectors 435. These operations correspond to processing stage 1 described above with regard to FIG. 2. By using shifting invariance transformation logic 440, scaling invariance transformation logic 445, permutation invariance transformation logic 450 and size invariance transformation logic 455, bag-based feature extractor 430 transforms the flow-based feature vectors 425 into final bag-based feature vectors 435 each of which corresponds to cumulative feature vector 250 in FIG. 2.

Referring now to FIG. 5 (with continued reference to FIGS. 1 and 2), a flow chart is described of method 500 for generating a robust representation (e.g., the cumulative feature vector 250) of network traffic for detecting malware variations. Method 500 is performed by representation generation logic 124 depicted in FIG. 1. Method 500 begins at 505 where network traffic records 128 are divided so as to create at least one group of network traffic records which corresponds to bag 210 in FIG. 2. The at least one group of network traffic records includes network traffic records associated with network communications, such as malware network communication 156 or network communication 166 depicted in FIG. 1 between a computing device (e.g., computing device 150 or 160) and a server (e.g., unsafe network server 180 or safe network server 170) for a predetermined period of time.

At 510, a set of feature vectors 225 (1) to 225(N) is generated, each feature vector representing one of the records of the network communications included in the at least one group (bag 210) of network traffic records. Each feature vector 225(1) to 225(N) includes a predefined set of features 220(1) to 220(M) extracted from one of the network traffic records.

At 515, a self-similarity matrix for each feature of the predefined set of features (matrices 230(1) to 230(M) is computed using all feature vectors 225(1) to 225(N) generated for the at least one group (bag 210), each self-similarity matrix being a representation of one feature of the predefined set of features 220(1) to 220(M) that is invariant to an increase or a decrease of values of the one feature across all of the feature vectors 225(1) to 225(N) generated for the at least one group (bag 210) of network traffic records.

At 520, each self-similarity matrix 230(1) to 230(M) is transformed into a set of corresponding histograms 240(1) to 240(M). Each histogram 240(1) to 240(M) is a representation of the one feature, e.g., feature 220(1), that is invariant to a number of network traffic records in the at least one group (bag 210) of network traffic records.

At 525, a cumulative feature vector 250 is generated based on the set of corresponding histograms 240(1) to 240(M), the cumulative feature vector 250 being a cumulative representation of the predefined set of features 220(1) to 220(M) of all network traffic records included in the at least one group of network traffic records, e.g., of bag 210.

At 530, a malware network communication (e.g., malware network communication 156 in FIG. 1) between the computing device (e.g., computing device 150) and the server (e.g., unsafe server 180) is identified based on the cumulative feature vector 250.

Figure 6:
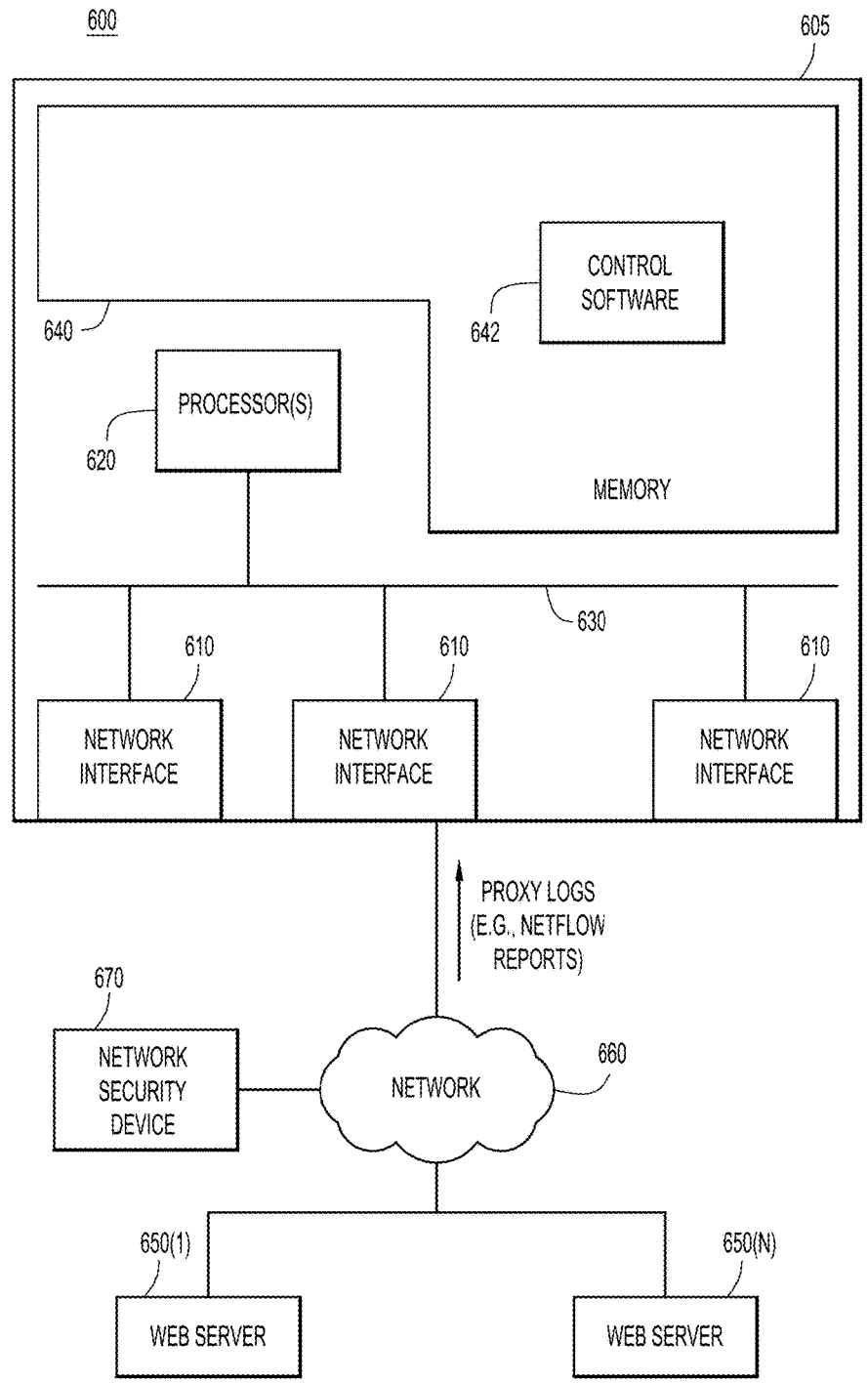
FIG. 6 is a diagram of a network environment in which the malware detection techniques presented herein may be used, according to another example embodiment.

Reference is now made to FIG. 6. FIG. 6 is a system diagram illustrating how the process depicted in FIG. 2 may be deployed in a network/computing environment 600 according to another example embodiment. A device 605, which may be a server computer, firewall, network intrusion device, etc., includes a plurality of network interfaces 610 (e.g., network ports of a network interface card), a processor 620 (or multiple processors), a bus 630 and memory 640. Memory stores instructions for, among other functions, control software 642. When the processor 620 executes the software instructions for control software 642, the processor is operable to perform the operations described herein. The device 605 is configured to intercept network traffic from one or more web servers 650(1)-650(N) connected to network 660 so as to detect attempts to inject malware into any device connected in network 660. Network 660 may be an enterprise network. A network security device (e.g., firewall) or any network device connected to network 660 may generate proxy logs (or NetFlow reports) that are sent to the device 605 for use in techniques presented herein.

The memory 640 may include read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the processor 620) it is operable to perform the operations described herein.

Figure 7A:
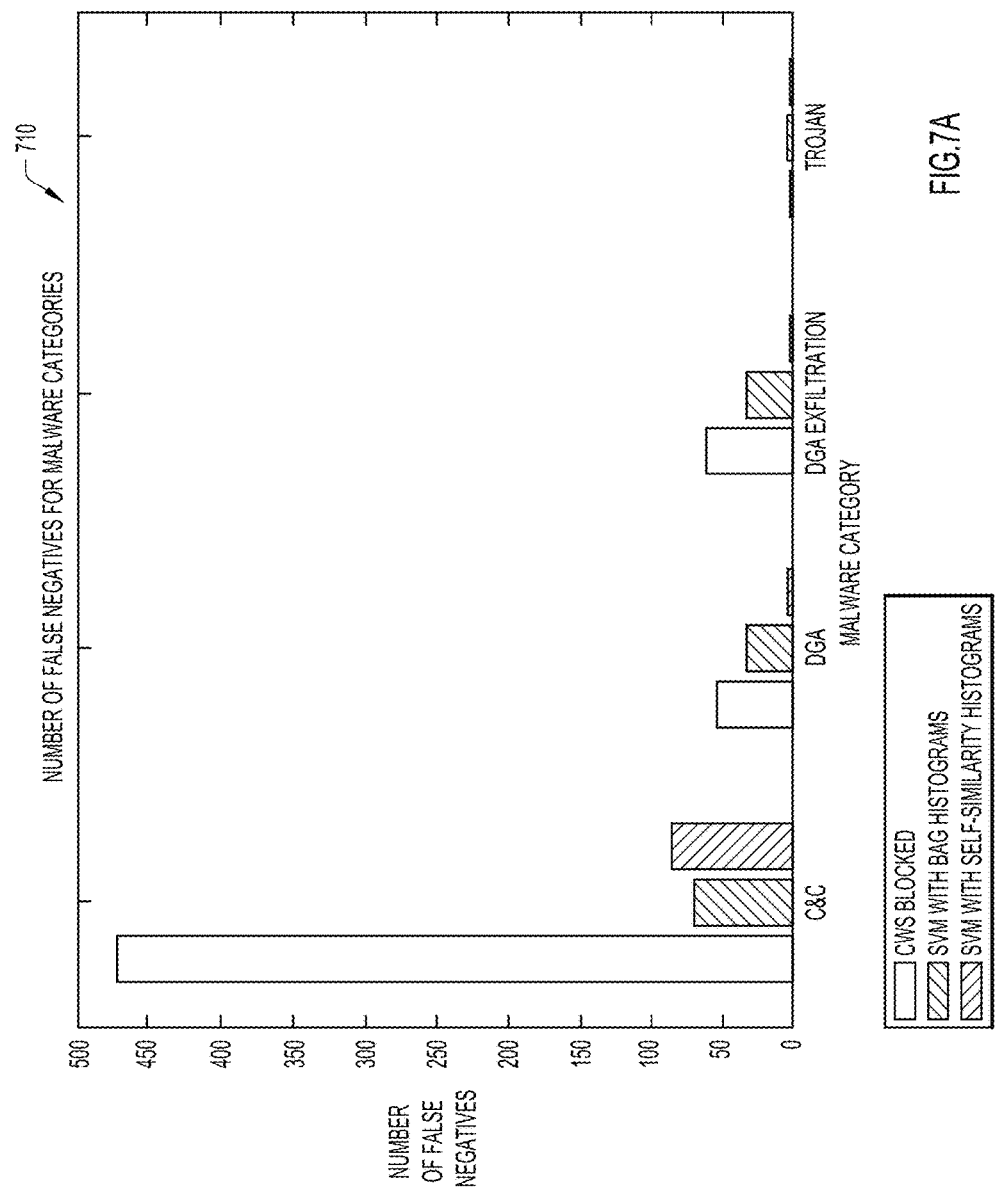
FIGS. 7A and 7B are diagrams illustrating analysis of false negatives (number of missed malware samples) and true positives (number of detected malware samples) based on histograms computed directly from feature vectors, and self-similarity histograms produced by the process depicted in FIG. 2 according to an example embodiment.
Figure 7B:
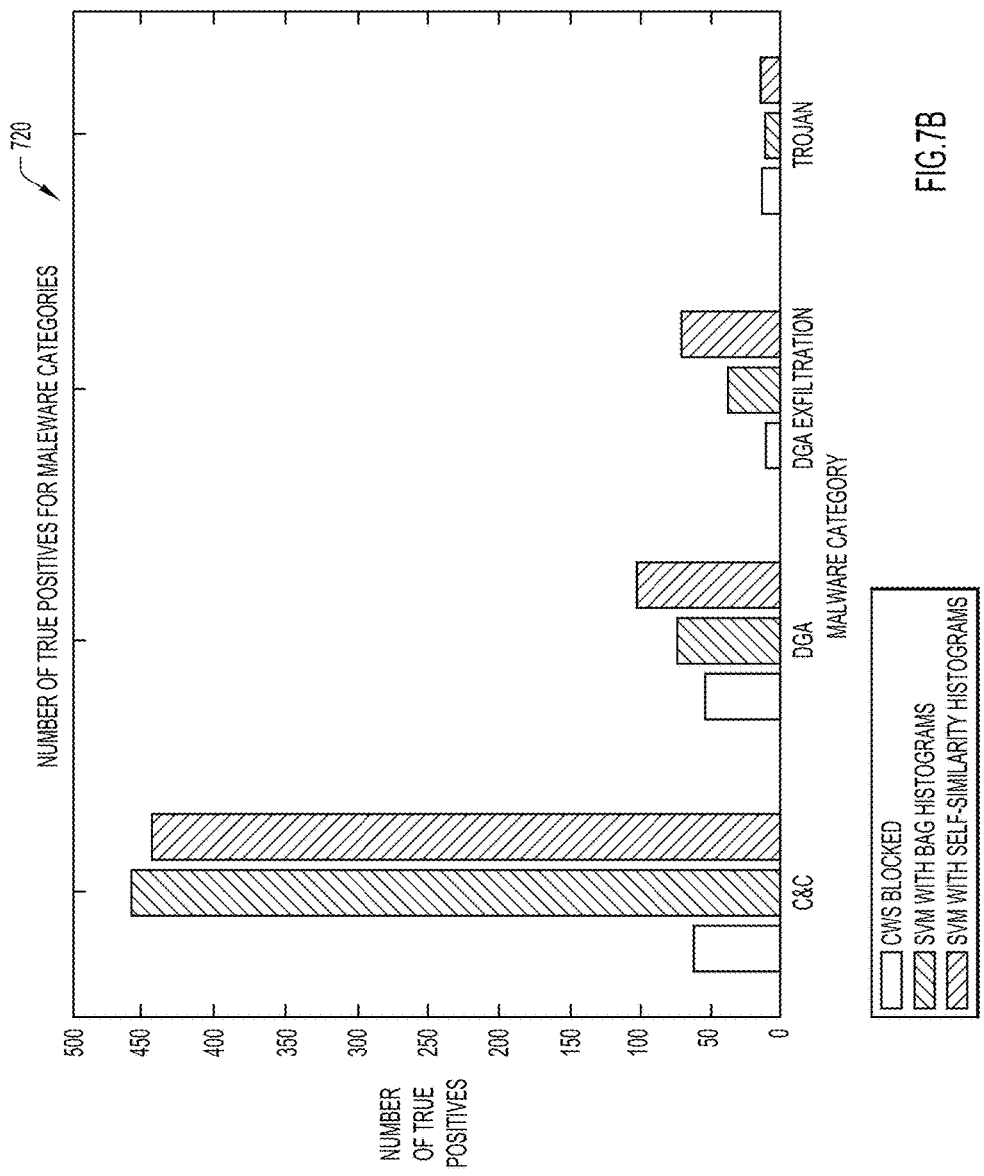
Figure 8:
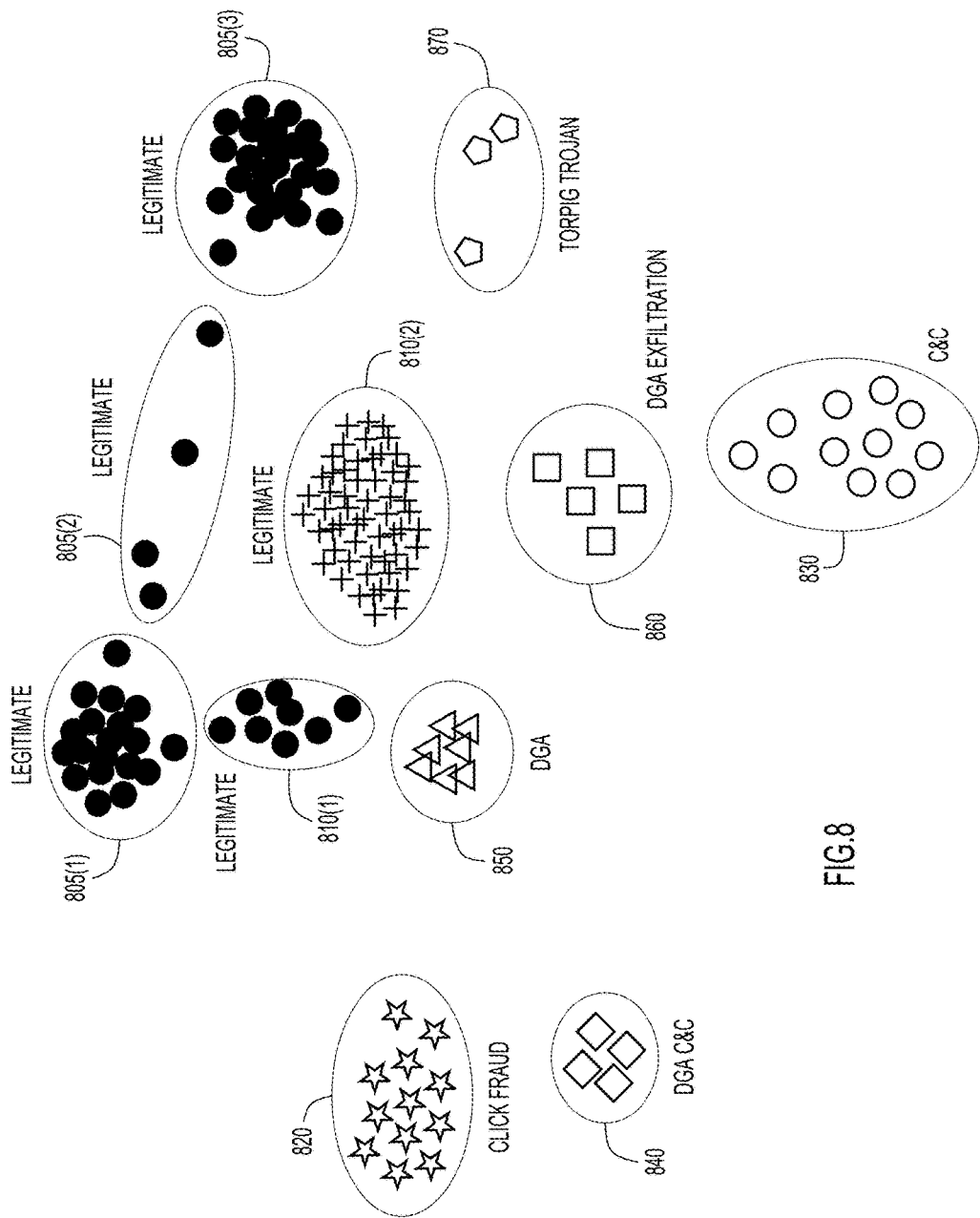
FIG. 8 is a diagram illustrating clustering results, where input bags are used with the representation generated according to the process of FIG. 2 according to an example embodiment.

Reference is now made to FIGS. 7A, 7B and 8 which show results of two experiments that were conducted to test the cumulative feature vector 250, i.e., the representation of bag 210 that is invariant against shifting, scaling, permutation, and size of bag 210 depicted in FIG. 2. In a first experiment, the results of which are depicted in FIGS. 7A and 7B, it was determined how the representation of bag 210 influences the efficiency of classifier logic 126 in classifying bag 210. In a second experiment, the results of which are depicted in FIG. 8, the impact of the new representation of the bag 210 on clustering and correlation of samples was determined.

For the experiments, evaluation datasets were divided into two parts: training, and testing. Both datasets were obtained from real network traffic of 80 international companies (more than 500,000 seats) in form of proxy logs. Flows from proxy logs were grouped into bags, where each bag contained flows with the same user (or source IP) and the same hostname domain. Thus, each bag represented a communication of a user with a particular domain. To be able to compute a representative histogram from feature values, samples with less than 5 flows were discarded.

There are 5 malware categories: malware with command & control (C&C) channels, malware with domain generation algorithm (DGA), DGA exfiltration, click fraud, and trojans. A summary of malicious categories is shown in Table 2.

TABLE 2

Number of flows and bags of malware categories and background traffic

| Category | Samples | |
| --- | --- | --- |
| | Flows | Bags |
| C&C malware | 30,105 | 532 |
| DGA malware | 3,772 | 105 |

TABLE 2-continued

Number of flows and bags of malware categories and background traffic

| Category | Samples | |
|---|---|---|
| | Flows | Bags |
| DGA exfiltration | 1,233 | 70 |
| Click fraud | 9,434 | 304 |
| Trojans | 1,230 | 12 |
| Background | 867,438 | 13,977 |
| Total | 913,212 | 15,000 |

The rest of the background traffic was considered as legitimate traffic. Two approaches were compared: the proposed technique for generating a first representation described with regard to FIG. 2 and a less invariant second representation in which each bag is represented as a joint histogram of the input feature values. This means that one histogram is computed from values of every feature of the bag, and the histograms are then concatenated into one final feature vector for each bag. However, the second representation is not computed based on histograms from self-similarity matrices, but directly from the input feature values. Comparing these two approaches shows the importance of a self-similarity matrix when dealing with malware variations.

First, a two-class Support Vector Machine (SVM) classifier which corresponds to classifier logic 126 in FIG. 1 was evaluated on both representations. To demonstrate the modifications in positive bags, only click fraud bags were used in the training set as positive bags. Also 5977 negative bags were included in the training set. The SVM classifier was evaluated on bags from C&C and DGA malware, DGA exfiltration, trojans, and 8000 negative background bags. The results are shown in Table 3. Both classifiers have the same results on the training set, however SVM classifier where the data were represented with the proposed self-similarity approach achieved better performance on the test data.

TABLE 3

Summary of the SVM results from the baseline (second) representation and the self-similarity (first) representation.

| | Training Data | | | | | Test Data | | | | |
|---|---|---|---|---|---|---|---|---|---|---|
| Representation | TP | FP | TN | precision | recall | TP | FP | TN | precision | recall |
| baseline | 304 | 0 | 6976 | 1.0 | 1.0 | 584 | 13 | 7987 | 0.998 | 0.81 |
| self-similarity | 304 | 0 | 6976 | 1.0 | 1.0 | 633 | 6 | 7994 | 0.999 | 0.88 |

FIGS. 7A and 7B illustrate results from a more detailed analysis of false negatives for malware categories (number of missed malware samples) and true positives for malware categories (number of detected malware samples) for Cloud Web Security (CWS) blocks and SVM classifier (which corresponds to classifier logic 126 in FIG. 1). This analysis is based on two types of representations: histograms computed directly from feature vectors, and histograms such as histograms 240(1) to 240(M) that are computed based on locally-scaled self-similarity matrices such as matrices 230 (1) to 230(M) shown in FIG. 2. Chart 710 in FIG. 7A shows numbers of false negatives for malware categories C&C, DGA, DGA exfiltration, and trojan of the bags. Chart 720 in FIG. 7B shows numbers of true positives for the same malware categories of the bags to compare three different approaches: CWS blocks and SVM classifier based on two types of representations: histograms computed directly from feature vectors, and self-similarity histograms. As shown in FIGS. 7A and 7B, due to the self-similarity representation presented herein, the SVM classifier was able to correctly classify all Domain Generation Algorithm (DGA) exfiltration, and trojan, and most of DGA malware bags, with a small increase of false negatives for C&C. Overall, the representation shows significant improvements when compared to CWS blocks, and better robustness than the approach without self-similarity.

FIG. 8 is a two-dimensional graphical illustration of clustering results, where input bags are represented with the representation generated according to the process of FIG. 2. The clustering properties of the new representation were evaluated with a similarity learning algorithm. FIG. 8 shows how changing malware parameters influence similarity of samples, i.e. whether a modified malware sample is still considered to be similar to other malware samples of the same category. Two malware categories were included into the training set (click fraud and C&C) together with 5000 negative bags. As shown in FIG. 8, legitimate bags 805(1)-805(3) are concentrated in three large clusters on the top and in groups of non-clustered bags 810(1) and 810(2) located in the center. Malicious bags were clustered into six clusters according to the malware categories. Cluster 820 represents the group of click fraud bags and cluster 830 represents the group of C&C bags. Further malicious bags were clustered in DGA C&C cluster 840, DGA cluster 850, DGA exfiltration cluster 860 and TorPig trojan cluster 870.

In summary, modern malware evades detection by changing its parameters, which complicates the design of new detection mechanisms. The techniques presented herein create a generalized representation of malware behaviors invariant to various changes exhibited as modified traffic patterns. The invariance ensures that the feature representations of behavior variations are still similar. The new representation improves the efficacy in data-driven classifiers since malware variants are successfully recognized.

There are numerous advantages to these techniques. Malware samples are represented from bags of flows. As opposed to traditional flow-based representation, where each flow is represented with one feature vector, this approach uses bags (sets) of flows to capture much more information from each sample, most importantly malware dynamics and behavior in time. This enables more detailed and precise modeling of malware behaviors, resulting in better detection and classification performance. In addition, malware samples are represented robustly and invariantly against variations and temporal changes. Thus, detection of malware can be performed despite the malware changing its parameters (e.g. change in URL pattern, number of bytes, user Agent, etc.). These techniques have an immediate application in data driven detectors and classifiers. Since the features are more representative, they significantly improve the efficacy results.

Since most of the current undetected malicious behaviors are alternatives of known malware, these techniques directly increase the number of detected threats and incidents. These techniques are useful in products that process flows (e.g. proxy logs or NetFlow records) with a possible extension to other logging systems. These techniques enable automatic detection of malware variants that would otherwise have to be manually captured by security analysts.

Specifically, the new representation is invariant to the following changes: malicious code, payload, or obfuscation, server or hostname, URL path or filename, number of URL parameters, their names or values, encoded URL content, number of flows, time intervals between flows, ordering of flows and size of flows.

An advantage of all network-based security approaches is that they extract features from headers of network communication rather than from the content. As a result, any changes to the payload have substantially no effect on the features. The representation operates on the level of bags, where each bag is a set of flows with the same user and hostname. If an attacker changes an IP address or a hostname of the remote server, the representation creates a new bag with similar feature values as in the previous bag with the original IP address or hostname.

A straightforward way of evading classifiers that rely on specific URL patterns is the change in path or filename, the number of URL parameters, and their names or values from sample to sample. Since the variability of these features remains constant within each bag, these changes have substantially no effect on the resulting new representation.

Hiding information in the URL string represents another way to exfiltrate sensitive data. When the URL is encrypted and encoded (e.g. with base 64), exfiltrated data change the URL length and may globally influence other features as well. As the new representation is invariant against shifting, changing the URL length does not change the histograms of feature differences.

Another option for an attacker to hide in the background traffic is increasing or reducing the number of flows related to the attack. Such modification of the attack does not affect the new representation, as long as there are enough flows to create the feature distributions.

Time intervals between flows have been used in many previous approaches for their descriptive properties. This feature is an alternative way to the new representation to model a relationship between individual flows. It has been determined that current malware samples frequently modify the inter-arrival time to remain hidden in the background traffic.

An attacker can easily change the ordering of flows to evade detection based on patterns or predefined sequences of flows. The new representation uses the flow-based feature values to compute a set of histograms and therefore the ordering of flows does not matter. In addition, increasing or decreasing a flow count has only a minor effect on the shape of the distributions represented by the histograms.

On the other hand, the new representation is not invariant to a change in static behavior, multiple behaviors in a bag and encrypted HTTPS traffic, and real-time changes and evolution. The new representation does not model malware behaviors, where all flows associated with a malware are identical. Such behavior has no dynamics and can be classified with flow-based approaches with comparable results. In case more behaviors are associated with a bag, such as when a target hostname is compromised and communicates with a user with legitimate and malicious flows, the new representation does not guarantee the invariance against the attacker's changes. Such bags contain a mixture of legitimate and malicious flows and their combination could lead to a different representation.

URLs or other flow fields are not available in encrypted HTTPS traffic. In this case, only a limited set of flow-based features can be used, which reduces the discriminative properties of the new representation. Finally, in case a malware sample for a given user and hostname starts changing its behavior dynamically and frequently, the new bag representation varies over time. Such inconsistency decreases the efficacy results. However, creating such highly dynamic malware behavior requires a considerable effort. Therefore such samples are not seen very often in real network traffic.

In one form, a method is provided comprising: at a networking device, dividing network traffic records to create at least one group of network traffic records, the at least one group including network traffic records being associated with network communications between a computing device and a server for a predetermined period of time, generating a set of feature vectors, each feature vector of the set of feature vectors representing one of the network traffic records of the network communications included in the at least one group of network traffic records, wherein each feature vector comprises a predefined set of features extracted from one of the network traffic records, computing a self-similarity matrix for each feature of the predefined set of features using all feature vectors generated for the at least one group, each self-similarity matrix being a representation of one feature of the predefined set of features that is invariant to an increase or a decrease of values of the one feature across all of the feature vectors generated for the at least one group of network traffic records, transforming each self-similarity matrix into a corresponding histogram to form a set of histograms, each histogram being a representation of the one feature that is invariant to a number of network traffic records in the at least one group of network traffic records, generating a cumulative feature vector based on the set of histograms, the cumulative feature vector being a cumulative representation of the predefined set of features of all network traffic records included in the at least one group of network traffic records, and identifying a malware network communication between the computing device and the server based on the cumulative feature vector.

In another form, an apparatus is provided comprising: one or more processors, one or more memory devices in communication with the one or more processors, and at least one network interface unit coupled to the one or more processors, wherein the one or more processors are configured to: divide network traffic records to create at least one group of network traffic records, the at least one group including network traffic records being associated with network communications between a computing device and a server for a predetermined period of time, generate a set of feature vectors, each feature vector of the set of feature vectors representing one of the network traffic records of the network communications included in the at least one group of network traffic records, wherein each feature vector comprises a predefined set of features extracted from one of the network traffic records, compute a self-similarity matrix for each feature of the predefined set of features using all feature vectors generated for the at least one group, each self-similarity matrix being a representation of one feature of the predefined set of features that is invariant to an increase or a decrease of values of the one feature across all of the feature vectors generated for the at least one group of network traffic records, transform each self-similarity matrix into a corresponding histogram to form a set of histograms, each histogram being a representation of the one feature that is invariant to a number of network traffic records in the at least one group of network traffic records, generate a cumulative feature vector based on the set of histograms, the cumulative feature vector being a cumulative representation of the predefined set of features of all network traffic records included in the at least one group of network traffic records, and identify a malware network communication between the computing device and the server based on the cumulative feature vector.

In still another form, one or more computer-readable non-transitory storage media are provided encoded with software comprising computer executable instructions that when executed by one or more processors cause the one or more processor to: divide network traffic records to create at least one group of network traffic records, the at least one group including network traffic records being associated with network communications between a computing device and a server for a predetermined period of time, generate a set of feature vectors, each feature vector of the set of feature vectors representing one of the network traffic records of the network communications included in the at least one group of network traffic records, wherein each feature vector comprises a predefined set of features extracted from one of the network traffic records, compute a self-similarity matrix for each feature of the predefined set of features using all feature vectors generated for the at least one group, each self-similarity matrix being a representation of one feature of the predefined set of features that is invariant to an increase or a decrease of values of the one feature across all of the feature vectors generated for the at least one group of network traffic records, transform each self-similarity matrix into a corresponding histogram to form a set of histograms, each histogram being a representation of the one feature that is invariant to a number of network traffic records in the at least one group of network traffic records, generate a cumulative feature vector based on the set of histograms, the cumulative feature vector being a cumulative representation of the predefined set of features of all network traffic records included in the at least one group of network traffic records, and identify a malware network communication between the computing device and the server based on the cumulative feature vector.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a networking device, dividing network traffic records to create at least one group of network traffic records, the at least one group including network traffic records being associated with network communications between a computing device and a server for a predetermined period of time;
   generating a set of feature vectors, each feature vector of the set of features vectors representing one of the network traffic records of the network communications included in the at least one group of network traffic records, wherein each feature vector comprises a predefined set of features extracted from one of the network traffic records;
   computing a self-similarity matrix for each feature of the predefined set of features using all feature vectors generated for the at least one group, each self-similarity matrix being a representation of one feature of the predefined set of features that is invariant to an increase or a decrease of values of the one feature across all of the feature vectors generated for the at least one group of network traffic records, each self-similarity matrix including a plurality of elements in rows and columns, wherein an (i, j)-th element of a self-similarity matrix corresponds to a distance between a feature value of an i-th network traffic record and a feature value of a j-th network traffic record;
   transforming each self-similarity matrix into a corresponding histogram to form a set of histograms, each histogram being a representation of the one feature that is invariant to a number of network traffic records in the at least one group of network traffic records;
   generating a cumulative feature vector based on the set of histograms, the cumulative feature vector being a cumulative representation of the predefined set of features of all network traffic records included in the at least one group of network traffic records;
   training a classifier based on the cumulative feature vector to produce a trained classifier;
   classifying, by the trained classifier, the at least one group as being malicious; and
   identifying a malware network communication between the computing device and the server utilizing the at least one classified group,
   wherein the cumulative feature vector enables detection of variations and modifications of the malware network communication.

2. The method of claim 1, further comprising:
   transforming each self-similarity matrix into a locally-scaled self-similarity matrix, each locally-scaled self-similarity matrix being a representation of the one feature of the predefined set of features that is invariant to values of the one feature across all of the feature vectors being multiplied by a common factor.

3. The method of claim 1, wherein generating the cumulative feature vector comprises concatenating the histograms in the set of histograms to form the cumulative feature vector.

4. The method of claim 1, wherein the variations and modifications of the malware network communication include a variation in one or more of: a shift of the flow-based features, a scale of the flow-based features, a permutation of the flow-based features, a number of the flow-based features, or in a size of the at least one group of network traffic records, and
   further comprising transforming a representation of the at least one group of network traffic records to be invariant against the variations and modifications of the malware network communication.

5. The method of claim 1, wherein the network traffic records include proxy logs and network flow reports, and
   wherein the predefined set of flow-based feature values includes values describing a structure of a Uniform Resource Locator (URL), a number of bytes transferred from the server to the computing device, a status of a user agent, a Hypertext Transfer Protocol (HTTP) status, a Multipurpose Internet Mail Extension (MIME) type, and a port value.

6. The method of claim 1, wherein the self-similarity matrix is a symmetric positive semidefinite matrix in which the rows and columns represent individual network communications between the computing device and the server.

7. The method of claim 6, further comprising:
scaling all values in the self-similarity matrix into an interval [0,1] to produce scale invariance.

8. An apparatus comprising:
one or more processors;
one or more memory devices in communication with the one or more processors; and
at least one network interface unit coupled to the one or more processors,
wherein the one or more processors are configured to:
divide network traffic records to create at least one group of network traffic records, the at least one group including network traffic records being associated with network communications between a computing device and a server for a predetermined period of time;
generate a set of feature vectors, each feature vector of the set of feature vectors representing one of the network traffic records of the network communications included in the at least one group of network traffic records, wherein each feature vector comprises a predefined set of features extracted from one of the network traffic records;
compute a self-similarity matrix for each feature of the predefined set of features using all feature vectors generated for the at least one group, each self-similarity matrix being a representation of one feature of the predefined set of features that is invariant to an increase or a decrease of values of the one feature across all of the feature vectors generated for the at least one group of network traffic records, each self-similarity matrix including a plurality of elements in rows and columns, wherein an (i, j)-th element of a self-similarity matrix corresponds to a distance between a feature value of an i-th network traffic record and a feature value of a j-th network traffic record;
transform each self-similarity matrix into a corresponding histogram to form a set of histograms, each histogram being a representation of the one feature that is invariant to a number of network traffic records in the at least one group of network traffic records;
generate a cumulative feature vector based on the set of histograms, the cumulative feature vector being a cumulative representation of the predefined set of features of all network traffic records included in the at least one group of network traffic records;
train a classifier based on the cumulative feature vector to produce a trained classifier;
classify, by the trained classifier, the at least one group as being malicious; and
identify a malware network communication between the computing device and the server utilizing the at least one classified group,
wherein the cumulative feature vector enables detection of variations and modifications of the malware network communication.

9. The apparatus of claim 8, wherein the one or more processors are configured to:
transform each self-similarity matrix into a locally-scaled self-similarity matrix, each locally-scaled self-similarity matrix being a representation of the one feature of the predefined set of features that is invariant to values of the one feature across all of the feature vectors being multiplied by a common factor.

10. The apparatus of claim 8, wherein the one or more processors generate the cumulative feature vector by concatenating the histograms in the set of histograms to form the cumulative feature vector.

11. The apparatus of claim 8, wherein the variations and modifications of the malware network communication include a variation in one or more of: a shift of the flow-based features, a scale of the flow-based features, a permutation of the flow-based features, a number of the flow-based features, or in a size of the at least one group of network traffic records, and
wherein the one or more processors are configured to:
transform a representation of the at least one group of network traffic records to be invariant against the variations and modifications of the malware network communication.

12. The apparatus of claim 8, wherein the network traffic records include proxy logs and network flow reports, and
wherein the predefined set of flow-based feature values includes values describing a structure of a Uniform Resource Locator (URL), a number of bytes transferred from the server to the computing device, a status of a user agent, a Hypertext Transfer Protocol (HTTP) status, a Multipurpose Internet Mail Extension (MIME) type, and a port value.

13. The apparatus of claim 8, wherein the self-similarity matrix is a symmetric positive semidefinite matrix in which the rows and columns represent individual network communications between the computing device and the server.

14. The apparatus of claim 13, wherein the one or more processors are configured to:
scale all values in the self-similarity matrix into an interval [0,1] to produce scale invariance.

15. One or more computer readable non-transitory storage media encoded with software comprising computer executable instructions that when executed by one or more processors cause the one or more processor to:
divide network traffic records to create at least one group of network traffic records, the at least one group including network traffic records being associated with network communications between a computing device and a server for a predetermined period of time;
generate a set of feature vectors, each feature vector of the set of feature vectors representing one of the network traffic records of the network communications included in the at least one group of network traffic records, wherein each feature vector comprises a predefined set of features extracted from one of the network traffic records;
compute a self-similarity matrix for each feature of the predefined set of features using all feature vectors generated for the at least one group, each self-similarity matrix being a representation of one feature of the predefined set of features that is invariant to an increase or a decrease of values of the one feature across all of the feature vectors generated for the at least one group of network traffic records, each self-similarity matrix including a plurality of elements in rows and columns, wherein an (i, j)-th element of a self-similarity matrix corresponds to a distance between a feature value of an i-th network traffic record and a feature value of a j-th network traffic record;
transform each self-similarity matrix into a corresponding histogram to form a set of histograms, each histogram being a representation of the one feature that is invariant to a number of network traffic records in the at least one group of network traffic records;

generate a cumulative feature vector based on the set of histograms, the cumulative feature vector being a cumulative representation of the predefined set of features of all network traffic records included in the at least one group of network traffic records;

train a classifier based on the cumulative feature vector to produce a trained classifier;

classify, by the trained classifier, the at least one group as being malicious; and identify a malware network communication between the computing device and the server utilizing the at least one classified group, wherein the cumulative feature vector enables detection of variations and modifications of the malware network communication.

16. The computer readable non-transitory storage media of claim 15, wherein the executable instructions further cause the one or more processors to:

transform each self-similarity matrix into a locally-scaled self-similarity matrix, each locally-scaled self-similarity matrix being a representation of the one feature of the predefined set of features that is invariant to values of the one feature across all of the feature vectors being multiplied by a common factor.

17. The computer readable non-transitory storage media of claim 15, wherein the executable instructions cause the one or more processors to generate the cumulative feature vector by concatenating the histograms in the set of histograms to form the cumulative feature vector.

18. The computer readable non-transitory storage media of claim 15, wherein the variations and modifications of the malware network communication include a variation in one or more of: a shift of the flow-based features, a scale of the flow-based features, a permutation of the flow-based features, a number of the flow-based features, or in a size of the at least one group of network traffic records, and wherein the executable instructions further cause the one or more processors to:

transform a representation of the at least one group of network traffic records to be invariant against the variations and modifications of the malware network communication.

19. The computer readable non-transitory storage media of claim 15, wherein the network traffic records include proxy logs and network flow reports, wherein the predefined set of flow-based feature values includes values describing a structure of a Uniform Resource Locator (URL), a number of bytes transferred from the server to the computing device, a status of a user agent, a Hypertext Transfer Protocol (HTTP) status, a Multipurpose Internet Mail Extension (MIME) type, and a port value, wherein the self-similarity matrix is a symmetric positive semidefinite matrix in which the rows and columns represent individual network communications between the computing device and the server.

20. The computer readable non-transitory storage media of claim 19, wherein the executable instructions cause the one or more processors to:

scale all values in the self-similarity matrix into an interval [0,1] to produce scale invariance.

\* \* \* \* \*